(12) United States Patent
Chen et al.

(10) Patent No.: US 7,889,691 B2
(45) Date of Patent: Feb. 15, 2011

(54) METHOD OF BROADCASTING PACKETS IN AD-HOC NETWORK

(75) Inventors: Wai Chen, Parsippany, NJ (US); Stephanie Demers, Westfield, NJ (US); John Lee, Howell, NJ (US); Marcus Pang, Manalapan, NJ (US); Ryokichi Onishi, Jersey City, NJ (US); Toshiro Hikita, Tama (JP)

(73) Assignees: Telcordia Technologies, Inc., Piscataway, NJ (US); Toyota Infotechnology Center, U.S.A., Inc., Palo Alto, CA (US)

( * ) Notice: Subject to any disclaimer, the term of this patent is extended or adjusted under 35 U.S.C. 154(b) by 733 days.

(21) Appl. No.: 11/983,829

(22) Filed: Nov. 13, 2007

(65) Prior Publication Data
US 2009/0122738 A1    May 14, 2009

(51) Int. Cl.
*H04J 3/08* (2006.01)
*H04L 12/56* (2006.01)

(52) U.S. Cl. .................. 370/315; 370/252; 370/278; 370/329; 370/401

(58) Field of Classification Search .................. 370/252, 370/278, 315, 328, 329, 401
See application file for complete search history.

(56) References Cited

U.S. PATENT DOCUMENTS

| | | | |
|---|---|---|---|
| 6,130,881 A * | 10/2000 | Stiller et al. | 370/238 |
| 7,023,818 B1 | 4/2006 | Elliot | |
| 2001/0033548 A1 | 10/2001 | Saleh et al. | |
| 2003/0202524 A1 | 10/2003 | Conner et al. | |
| 2005/0078672 A1 | 4/2005 | Caliskan et al. | |
| 2006/0007942 A1 | 1/2006 | Ogawa | |
| 2006/0126535 A1 | 6/2006 | Sherman | |
| 2006/0140123 A1 | 6/2006 | Conner et al. | |

OTHER PUBLICATIONS

International Search Report, dated Jan. 6, 2009.

* cited by examiner

*Primary Examiner*—John Pezzlo
(74) *Attorney, Agent, or Firm*—Philip J. Feig

(57) ABSTRACT

A method for distributing a packet to a plurality of moving nodes comprising receiving a packet containing at least a message, a sender identifier, a location of a sender, an identifier for a relay node and distance from the sender and the relay node, determining if a node receiving the packet is the relay node and immediately distributing the packet to a plurality of moving nodes if the receiving node is the relay node. If the receiving node is not the relay node, the method further comprises steps of waiting a set period of time, determining if a packet is received from a different sender containing the same message, within the period of time and distributing the packet to a plurality of moving nodes if a packet containing the same message is not received within the period of time. The distributed packet includes an identifier for a successive relay node.

19 Claims, 12 Drawing Sheets

FIG. 3A

| NODE ID | LOCATION | DISTANCE |
|---|---|---|
|  |  |  |

| NODE ID | LOCATION T | LOCATION T-1 | DISTANCE | RELATIVE DIRECTION |
|---|---|---|---|---|
|  |  |  |  |  |

300

METHOD OF BROADCASTING PACKETS IN AD-HOC NETWORK

FIELD OF INVENTION

This invention relates to an ad-hoc wireless network for communication in a mobile environment. More specifically, the invention relates to a method, communication device, and system for broadcasting messages in an ad-hoc wireless network.

BACKGROUND OF THE INVENTION

Mobile ad-hoc networks have become increasingly important in areas where deployment of communication infrastructure is difficult. A mobile ad-hoc network (MANET) is formed by multiple moving nodes equipped with wireless transceivers. The mobile nodes communicate with each other through multi-hop wireless links. Each node can transmit and receive information.

One type of MANET is a vehicular ad-hoc network (VANET) that refers to a mobile ad-hoc network designed to provide communications among nearby vehicles and between vehicles and nearby fixed equipment.

However, simply installing wireless antenna on a node and then transmitting uncoordinated communications would result in collision of data, interference between data and a significant transmission delay. By transmitting uncoordinated data, the airwaves would be flooded with a plurality of messages, which would result in a jamming of the radio waves, as the radio bandwidth is limited. As such, each node would interfere with each other's transmission and compete with each other for radio bandwidth for transmission. Further, all messages would propagate in all directions without any consideration of a desired transmission direction.

These problems become more apparent in ad-hoc networks where the nodes are moving at high speeds. The high mobility and lack of inherent relationships make a priori configuration of nodes into groups problematic. Information such as traffic advisories, Amber alerts, weather advisories, etc. must be relayed to all vehicles quickly, without delay and interference.

Additionally, information that is necessary for setting up safety communications must be exchanged in real-time, and vehicles in the groups must configure themselves in real-time so that safety communication can take place. The high mobility of uncoordinated vehicles implies frequent change of neighbors or vehicle groups, and poses difficulties of using support-servers (for mobility, address, name, media session) within vehicle groups. These key differences make existing tactical ad-hoc networking technologies not directly applicable to vehicle groups for safety communications.

Accordingly, there is a need for a method and system that allows for efficient relaying or broadcasting of message in a MANET or a VANET that can account for the mobility of the nodes and minimize interference and bandwidth usages.

SUMMARY OF INVENTION

The present invention focuses on relaying messages to all nodes in the network in an efficient manner.

Disclosed is a first method for broadcasting a data packet to a plurality of moving nodes. The method comprises the steps of receiving a broadcast data packet containing at least a message, a sender identifier, a location of a sender, an identifier for a relay node and distance from the sender and the relay node; determining if a node receiving the broadcast data packet is the relay node and immediately distributing the broadcast data packet to a plurality of moving nodes if the receiving node is the relay node. The data packet includes an identifier for a successive relay node.

If the receiving node is not the relay node, the method further comprises the steps of waiting a set period of time, determining if a broadcast data packet is received from a different sender containing the same message, within the period of time and distributing the broadcast data packet a plurality of moving nodes if a broadcast data packet containing the same message is not received within the period of time. The data packet includes an identifier for a successive relay node.

The message, the sender identifier, the location of the sender, and distance from the sender and the relay node is stored in a storage section.

The method further comprises the steps of determining a location of the receiving node, calculating a distance between the sending node and the receiving node based upon the location of the sender and the determined location of the receiving node; retrieving the distance of the sender and the relay node; and calculating the period of time at least based on the calculated distance and the distance of the sender and the relay node. A wait timer is set with the calculated period of time.

The period of time Wt=−(MaxWT/Range)*min{d, Range}+MaxWT, MaxWt is a default maximum wait time, range is the distance between the sending node and the relay node, and d is the calculated distance between the sending node and the receiving node.

The method further comprises selecting the relay node. The relay node is selected based upon a distance from the sending node. The step of selecting the relay node comprises the sub-steps of retrieving for each neighboring node, the neighboring node's identifier and position information, calculating for each neighboring node, a distance from the sending node and the neighboring node; and determining one node from all neighboring nodes that is the furthest from the sending node. The neighboring node that is the furthest is selected as the relay node.

The relay node can also be selected based upon a relative position and distance. The step of selecting the relay node further comprises the steps of determining a direction of movement of the sender, determining a location of the sender, calculating for each neighboring node a distance from the sender, determining for each neighboring node a relative location with respect to the direction of movement of the sender, and comparing for each neighboring node the determined direction of movement with the relative location. A neighboring node that is the furthest node having a relative location behind the direction of movement of the sender is selected as the relay node. The direction of movement for each node is determined based upon a current location of a node and a location of the node from a previous period which is retrieved from storage.

The location of each node is periodically determined and the result is stored in a storage section. This result is maintained for at least two consecutive periods.

The method further comprises broadcasting periodically an information data packet, the information data packet contains at least the broadcasting node's identifier and its location. The periodic information data packet is received from a plurality of neighboring nodes and the information contained therein is stored. Specifically, the node's identifier and location is stored in a forwarding table. The location of each neighboring node is stored for at least two consecutive periods.

The method also comprises the step of selecting a successive relay node from the plurality of moving nodes.

Also disclosed is a second method for broadcasting a data packet to a plurality of moving nodes. The second method comprises the steps of receiving a broadcast data packet containing at least a message, a sender identifier, a location of a sender, an identifier for a first and second relay node and distance from the sender and each of the first and second relay nodes, determining if a node receiving the broadcast data packet is either the first or second relay node, and immediately distributing the broadcast data packet to a plurality of moving nodes if the receiving node is the first or second relay node. The data packet includes an identifier for a successive relay node.

If the receiving node is not the first or second relay node, the method further comprises the steps of waiting a set period of time, determining if a broadcast data packet is received from a different sender containing a same message within the period of time, and distributing the broadcast data packet to a plurality of moving nodes if a broadcast data packet containing the same message is not received within the period of time.

The second method further comprises the step of selecting the first and second relay nodes. A neighboring node that is the furthest node having a relative location behind the direction of movement of the sender is selected as the first relay node. A neighboring node that is the furthest node having a relative location ahead of the direction of movement of the sender is selected as the second relay node.

Another node is selected as the successive relay node. The selection comprises the steps of retrieving for each neighboring node of the relay node, the neighboring node's identifier and position information, calculating for each neighboring node of the relay node, a distance from the relay node and the neighboring node and determining one node from all neighboring nodes that is the farthest from the relay node. The neighboring node that is the furthest from the relay node is selected as the successive relay node.

Alternatively, the successive relay node can be selected by determining a direction of movement of the data packet, determining a location of the relay node, calculating for each neighboring node a distance from the relay node, determining for each neighboring node a relative position of the neighboring node and the relay node; and comparing for each neighboring node the determined direction of movement of the data packet with the relative position of the neighboring node. A neighboring node that is the furthest node having a relative location in a direction opposite to the direction from which the data packet is received is selected as the successive relay node.

BRIEF DESCRIPTION OF THE DRAWINGS

These and other features, benefits, and advantages of the present invention will become apparent by reference to the following figures, with like reference numbers referring to like structures across the views, wherein:

FIGS. 3A and 3B illustrates examples of the routing table according to an embodiment of the invention;

DETAILED DESCRIPTION OF THE INVENTION

Definitions

A "Node" is a router which implements the routing protocol or method as specified in the following description. For example, a moving vehicle having a communication device is a node. For the purposes of this application, a node and moving vehicle are interchangeably used.

A "neighbor node" means that there is a direct link between two nodes. A node X is a neighbor node of node Y if node Y can hear node X.

A "hop" is a number of nodes in which a message is relayed. The hop count for a neighboring node is 1.

Figure 1:
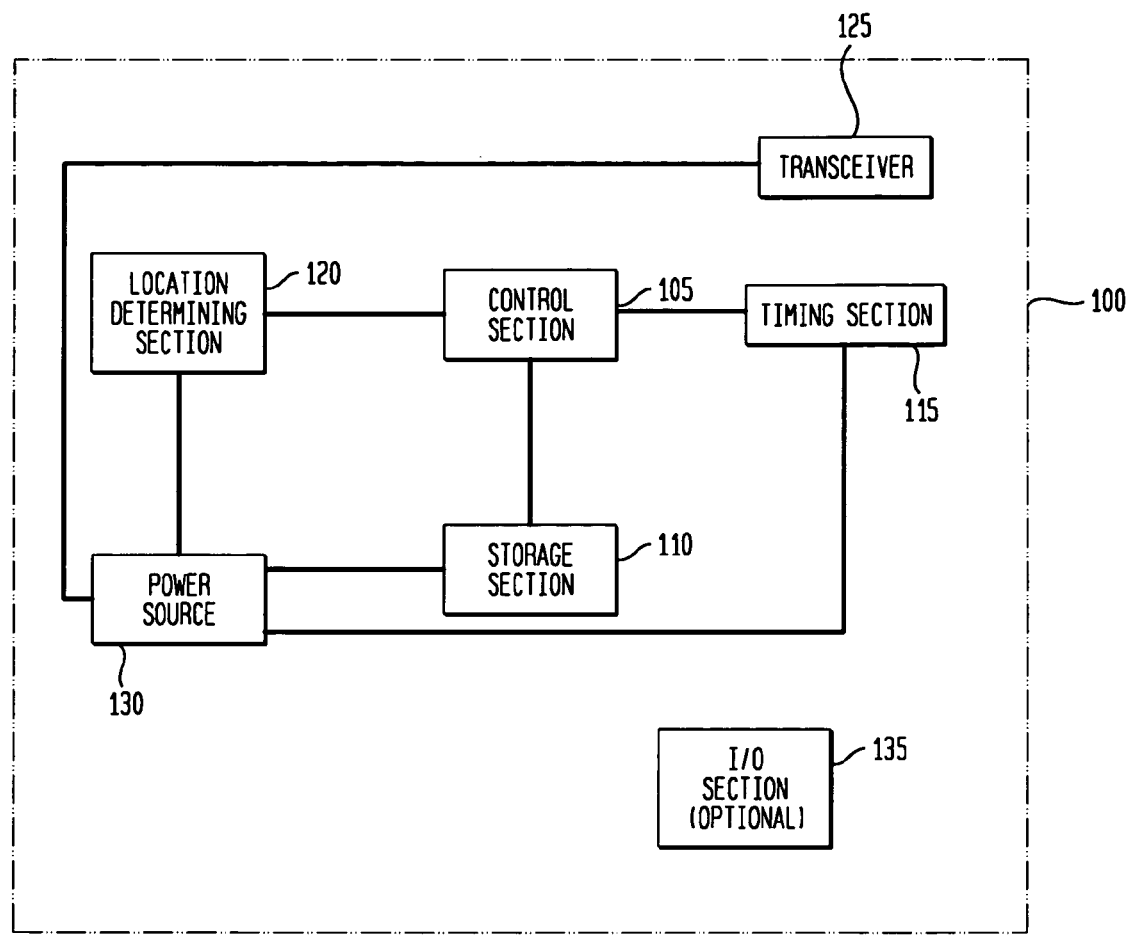
FIG. 1 illustrates an exemplary wireless communication device in accordance with an embodiment of the invention.

FIG. 1 depicts an example of a communications device that can implement the relay method or protocol in accordance with any of the described embodiments of the invention. A moving device or moving vehicle will include the communications device 100 which can be attached to, embedded in or used in combination with the moving vehicle.

The communications device 100 includes a computing device or control section 105, a storage section 110, a timing section 115, a location determining section 120, a transceiver 125 and a power source 130. The transceiver 125 is for providing wireless communication between nodes in a radio coverage range.

The control section 105 can be any type of controller such as, but not limited to, a microcontroller or a microprocessor. The control section 105 provides operational control by executing instructions, which have been programmed. A storage section 110 is disposed within the computing device 100 and in operational communication with the control section 105. The storage section 110 may be memory modules, removable media or a combination of multiple storage devices, etc., and is configured to store the processor-executable instructions necessary for the performance of the methods and protocols described herein.

Further, at least one timing section 115 is provided either as a separate component or in the control section 105. As depicted, the timing section 115 is a separate component. The timing section 115 provides the time interval tracking necessary for each of the timers referred to in the described embodiments, such as, but not limited to a wait timer, and a hello message timer.

The communication device 100 can also include a location determining section 120 such as a GPS device. Alternatively, the location determining section 120 can be external such as one located in a moving vehicle and the location information transmitted to the communication device 100 through an I/O section 135. Additionally, other location information such as a compass direction and speed can also be transmitted to the communication device 100 from the moving vehicle via the I/O section 135.

A power source 130 is electrically connected to all the components of the communications device 100 for providing operational power to the components as necessary. The communications device 100 further includes an internal clock (not shown) that maintains a clock for the device and is used as the timestamp for all messages.

The processor-executable instructions for performing the described embodiments may be embedded in the storage section 110 in a form such as an EPROM, Flash memory or other such non-volatile storage. Additionally, the processor-executable instructions may be stored on a computer readable media such as an optical or magnetic medium, or may be downloadable over a network (e.g., Internet). Preferably, a user, as necessary, can periodically update the processor-executable instructions in order to provide additional enhancements to the system as they become available.

Each communications device 100 is assigned a unique identifier to facilitate the transmission and reception of messages over the ad-hoc network. The unique identifier can be any number that is uniquely assigned to the communications device 100 so that no device within a specific area has the same unique identifier. This identifier must be assigned quickly to support immediate communication, if necessary. The unique identifier can be any unique number or address that facilitates communication, such as a MAC address, VIN number or IP address, this identifier is used as the node's identifier. Any moving vehicle with the communications device 100 can be a node of the ad-hoc network.

Figure 2A:
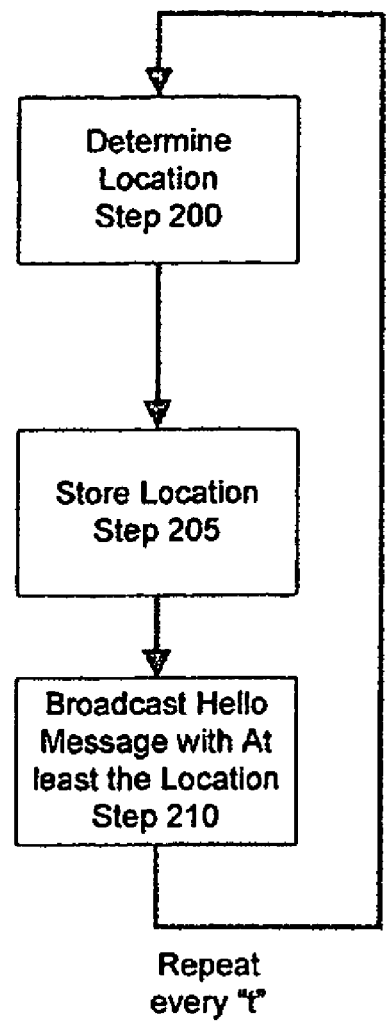
FIGS. 2A and 2B illustrate flow charts for creating a local relay table.
Figure 2B:
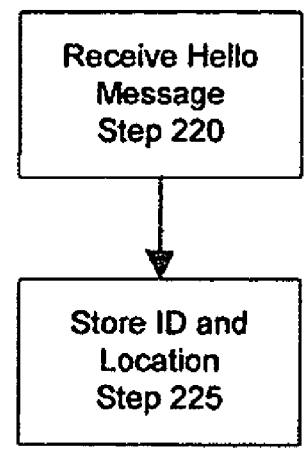

FIG. 2A and FIG. 2B depict the method of generating a relay or routing table according to one embodiment of the invention. Before a node is capable of relaying a message, a local routing table must be created in each node such that neighboring nodes are sensed. The routing table includes a list of all neighboring nodes that have a link, i.e. that are in radio communication range.

Each node periodically broadcasts a hello message. Any nodes within radio communication range of the broadcasting node will receive the broadcast message and senses a link. Each period, the nodes check the status of the connectivity for each link.

In one embodiment, the hello message includes a sending node's unique identifier and the sending node's location. The time of broadcasting of hello message can also be included in the message.

At step 200, a sending node determines its location. The location is output from the location determining section 120, i.e., GPS. In an embodiment, the location is given in a X, Y, Z coordinate system. The location is stored in the storage section 110, at step 205. In an embodiment, the time at which the location is calculated or determined is also stored.

At step 210, the node broadcasts the Hello message. The control section 105 creates the Hello message from information from the routing table. The Hello message is broadcast by the transceiver 125. Steps 200-210 are repeated periodically, e.g., every preset period of time. This period of time is maintained and timed by the timing section 115. The preset period of time is set such that the information does not become stale due to the mobility of the moving vehicles. However, the preset period of time is also set to avoid increasing the overhead needed to effectively select a group of relay nodes.

Each node collects the Hello messages from other nodes. If a node receives a Hello message, the node that sent the message becomes a neighbor node and the information is added to the receiving nodes routing table. At step 220, a node receives the Hello message. The node determines the source or sender of the Hello message. The node extracts the unique identifier from the message, e.g., sender's unique id. Additionally, the node extracts the location information and stores the extracted information in the storage section 110, at step 225. The Hello messages are not relayed.

FIG. 3A illustrates an example of the format of the routing table 300 according to an embodiment of the invention. As illustrated, the routing table 300 includes the unique identifiers for the neighboring nodes and the location of the neighboring nodes. This information will enable a node to calculate a distance from the node to each of its neighbors. The distance information is also added to the routing table 300.

In an embodiment, the distance information is calculated every preset period of time, i.e., upon receipt of the information from the neighboring nodes. In another embodiment, the distance is only calculated in an on demand basis.

FIG. 3B illustrates another example of the routing table 300 according to an embodiment of the invention. As illustrated in FIG. 3B, the routing table 300 includes the unique identifier for each node, the location of each neighboring node for the current Hello message period, the location of each neighboring node for the previous Hello message period, the distance from the node, and a relative direction.

Figure 4:
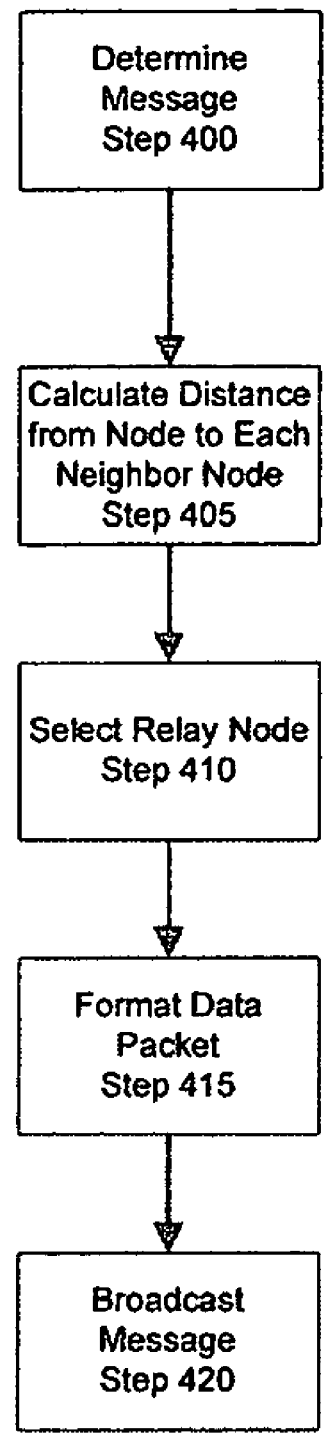
FIG. 4 illustrates a flow chart for a method of originating a message according to a first embodiment of the invention.

FIG. 4 illustrates a flow chart for a method of originating a data packet and broadcasting the data packet according to a first embodiment of the invention.

According to the first embodiment of the invention, a node that originates a data packet selects only one node from all of the neighboring nodes to relay the data packet, i.e., a first relay node. The first relay node is selected to be the furthest neighboring node from the originating node.

At step 400, the originating node determines the data or message for broadcast, e.g., type. There are many types of messages that can be broadcast, such as, but not limited to, emergency warnings, collision message, vehicle approaching warnings, and overhead clearance information.

At step 405, the originating node calculates its distance from each neighboring node. The distance is calculated using a calculation method that is described later in detail. At step 410, the originating node selects the relay node. As stated above, the relay node is selected based upon the distance from the originating node and particularly the neighboring node that is the furthest from the originating node. At step 415, the originating node, using the control section 105, formats the data packet for broadcast. The data packet includes, the message, the originating node's unique identifier, the originating node's position, the relay node unique identifier, the distance from the originating node and the relay node, and the time of broadcast.

At step 420, the originating node broadcasts the data packet.

FIGS. 5A-5D illustrate several different methods of determining the distance from the originating node and the neighboring node.

Figure 5A:
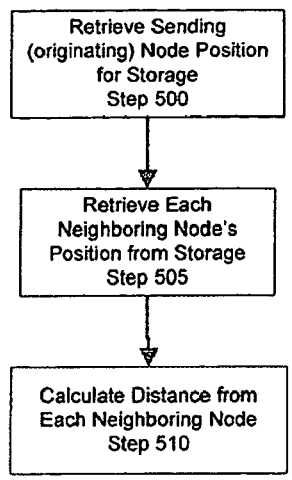
FIGS. 5A-5D illustrate flow charts of a plurality of methods for determining a distance from a originating node and each neighboring node.

FIG. 5A illustrates a calculating method for determining a distance between the originating node and each of its neighboring nodes according to an embodiment of the invention. The calculation method assumes that all nodes are moving at the approximately the same speed and that the preset period of time between updates, i.e., hello message interval, is short. At step 500, the originating node retrieves its own position information from the storage section 110, i.e., (SX1, SY1, SZ1). At step 505, the originating node retrieves the position information for each neighboring node from the storage section 110, e.g. (SXn, SYn,SZn). The "S" in front of the coordinate information indicated that the information is retrieved from the storage section 110.

At step 510, the originating node calculates the distance from itself and each neighboring node based upon the position information retrieved from storage.

Figure 5B:
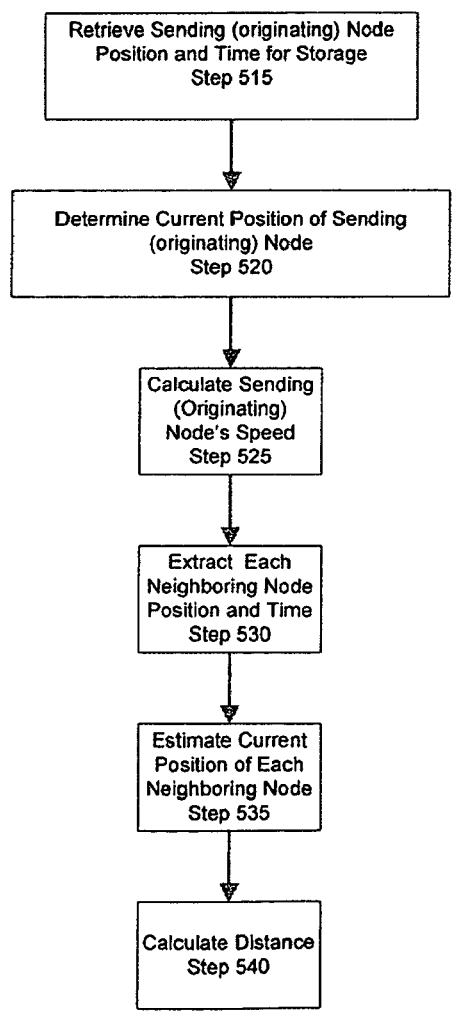
Figure 5C:
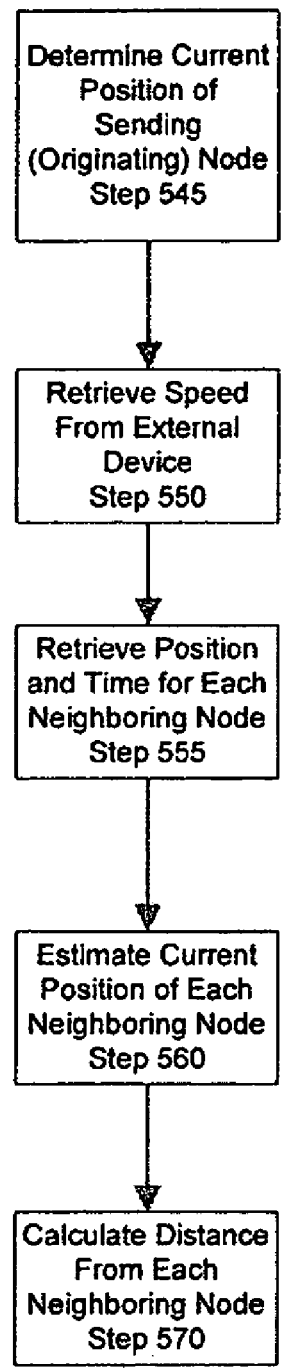

FIGS. 5B and 5C illustrate methods for determining a distance between the originating node and each of its neighboring nodes according to a second and third embodiment of the invention.

Both of these methods account for the motion of the nodes. These methods assume that the nodes are moving at approximately the same speed. Additionally, these methods assume that the nodes have synchronization in time for both the clocks and position information, i.e., GPS devices are synchronized. Therefore, the originating node estimates the current position of each neighboring node based upon its own speed. In other words, the estimation of a neighboring node's current position is based upon the nodes likely displacement from its previous position, which is known. The previous position is taken directly from storage. The likely displacement is calculated based upon an estimated velocity and time difference.

As illustrated in FIG. 5B, the originating node retrieves its position from the storage section 110, at step 515 (SX1, SY1, SZ1). In this embodiment, each time the position information is received or calculated, the time is stored in the storage section 110. Additionally, the time and position information for each neighboring node is maintained for at least two successive Hello message intervals, i.e., more than one preset period of time. At step 520, the originating node determines its current position (CX1, CY1, CZ1) and records the current time. The "C" in front of the coordinate information indicates that the information is current.

At step 525, the originating node calculates its motion based upon its change in position and the change in time between the calculation of the current position and the time when the previous position was calculated.

At step 530, the originating node retrieves the position information and time for each neighboring node from the storage section 110, e.g., from the routing table 300 (SXn, SYn, SZn). Using the calculated speed, the originating node estimates the current position of each neighboring node, at step 535, e.g., EXn, EYn, EZn. At step 540, the originating node calculates the distance from itself and each neighboring node based upon its actual position and the estimated position of each neighboring node.

The method illustrated in FIG. 5C is similar to the method illustrated in FIG. 5B except that instead of calculating the originating node's speed, the speed information is received from the I/O section 135 from the moving vehicle's odometer. At step 545, the originating node determines its current position (CX1, CY1, CZ1). At step 550, the speed of the originating node is received from the moving vehicle's odometer through the I/O section 135. At step 555, the originating node retrieves the position information and time for each neighboring node from the storage section 110, e.g., from the routing table 300 (SXn, SYn, SZn).

Using the received speed, the originating node estimates the current position of each neighboring node, at step 560, e.g., EXn, EYn, EZn. At step 570, the originating node calculates the distance from itself and each neighboring node based upon its actual position and the estimated position of each neighboring node.

Figure 5D:
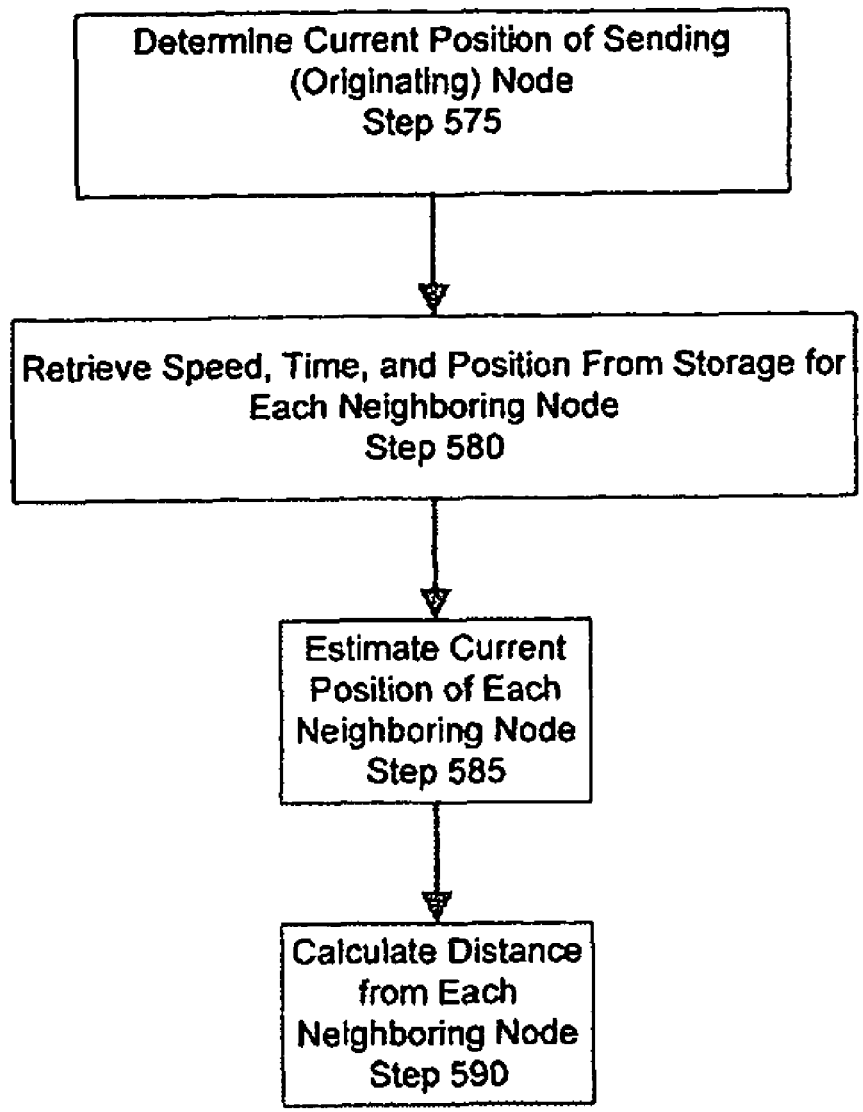

FIG. 5D illustrates a method for determining a distance between the originating node and each of its neighboring nodes according to a fourth embodiment of the invention.

According to this embodiment, the Hello message includes at least a unique identifier, position information, the time of calculation and the speed of the node that sends the Hello message. The routing table 300 includes for each neighboring node, the unique identifier, position information, the time of calculation, and the speed. Further, according to this embodiment, the position estimation is based on the speed of the node itself and not the speed of the originating node, and, therefore, there is no assumption that all nodes are traveling with the same speed.

At step 575, the originating node determines its current position (CX1, CY1, CZ1). At step 580, the originating node retrieves the position information, speed, and time for each neighboring node from the storage section 110, e.g., (SXn, SYn, SZn). Using the stored position information, speed of each neighboring node, and the time information, the originating node estimates the current position of each neighboring node, at step 585, e.g. EXn, EYn, EZn. At step 590, the originating node calculates the distance from itself and each neighboring node based upon its actual position and the estimated position of each neighboring node.

Figure 6:
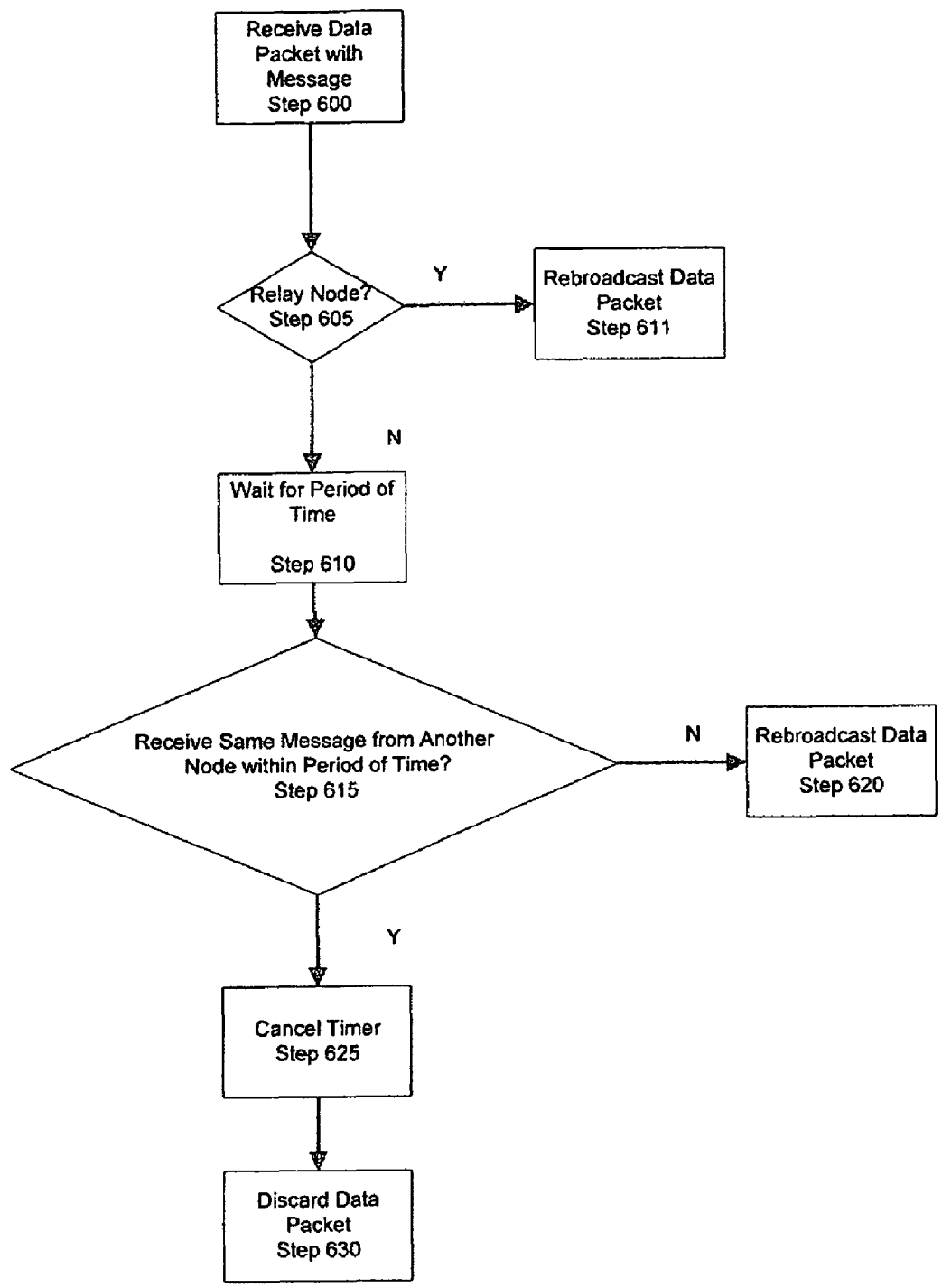
FIG. 6 illustrates a flow chart of a method of rebroadcasting a data packet according to an embodiment of the invention.

FIG. 6 illustrates a flow chart of a method of rebroadcasting a data packet according to an embodiment of the invention.

At step 600, a node receives a data packet for relaying. As stated above, the data packet includes the message, the originating node's unique identifier, the originating node's position, the first relay node unique identifier, the distance from the originating node and the first relay node, and the time of broadcast. The node differentiates a data packet for rebroadcasting from a Hello message based upon the format of the data packet. At step 605, the node determines if the node is a relay node. A node is a relay node if a sending node, e.g., originating node, identifies the node for relaying. The determination is based upon extracting the relay node unique identifier from the data packet. If the relay node unique identifier matches the node's own unique identifier, then the node is the relay node. If the node is the relay node, the node will immediately rebroadcast the data packet, at step 611. In one embodiment, the rebroadcasting method is similar to steps 405-420 as described above for the originating node. The relay node substitutes its position and unique identifier into the data packet and calculates the distance from itself and its neighboring node to selected one successive relay node, i.e., furthest neighboring node. The rebroadcast data packet will include the message, the rebroadcast node's unique identifier, its position, a unique identifier for a successive relay node, the distance from the rebroadcasting node and the successive relay node, and the time of rebroadcast.

Although, not depicted in FIG. 6, the relay node updates the sending node's information in the routing table 300, e.g., adding the originating node's position and time.

If the node is not the relay node, then instead of immediately relaying the data packet, the node waits for a period of time Wt. The data packet is stored in the storage section 110 temporarily. At step 610, the node sets a wait timer, i.e., timing section 115 for Wt. The calculation of Wt will be described later.

At step 615, the node determines if it has received the same message from other neighboring node within Wt. This determination is based upon the unique identifier of the sending node that is included also in data packets. Additionally, the node determines if the same message has been received. The received identifier and message is compared with data packets that are stored in the storage section 110. If the received message matches a message in the storage section 110 and the source of the message is different, i.e., different received identifier, than the wait timer is cancelled and stopped. The timing section 115 is cleared, at step 625. The node then discards the received data packet, at step 630. The node assumes that the message has already been relayed by another node.

If at step 615, the node determines that the data packet is not received containing the same message from other neighboring node within Wt, the node rebroadcasts the data packet, at step 620.

In one embodiment, the rebroadcasting method is similar to steps 405-420 as described above for the originating node. The node substitutes its position and unique identifier into the data packet and calculates the distance from itself and its neighboring node to select one successive relay node, i.e., furthest neighboring node. The rebroadcast data packet will include the message, the rebroadcast node's unique identifier, its position, a unique identifier for a successive relay node, and the distance from the rebroadcasting node, the successive relay node, and the time of rebroadcast.

Steps 600-630 are repeated for each rebroadcast such that the message is received by all nodes within the ad-hoc network.

Figure 7:
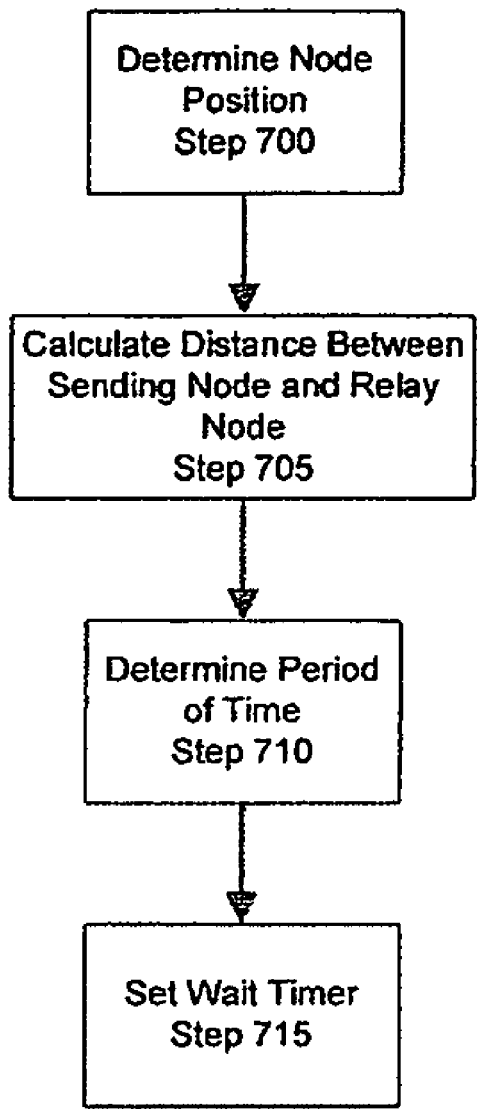
FIG. 7 illustrates the method of determining the wait time according to an embodiment of the invention.

As described above, if a node is not selected as the relay node the node sets a wait timer. FIG. 7 illustrates the method of determining the wait time (Wt) according to an embodiment of the invention. At step 700, the node determines its own position. At steps 705, the node calculates the current distance between the sending node, i.e., node that sent the data packet and itself. The distance from the sending node is based upon the current distance of the node and the position information included in the data packet.

At step 710, the node calculates the wait timer based at least on the distance calculated in step 705. The wait timer=−(MaxWT/Range)*min{d,Range}+MaxWT. MaxWt is a default maximum wait time. The maximum wait time is determined to optimize the latency and bandwidth use. For example, if maximum waiting time is too small then a lot of collisions will occur. Setting the maximum waiting time too large leads to long delays. "d" is the calculated distance from step 705. The "Range" is the distance from the sending node to the relay node that is included in the received data packet. The node extracts this information from the data packet and stores the information in the storage section 110.

At step 715, the node sets the wait timer, i.e., timing section 115, with the value calculated in step 710.

As described above, the relay nodes are selected based on the distance from an originating node or a rebroadcasting node. In another embodiment, the relay nodes are selected based on both the distance from an originating node or a rebroadcasting node and a direction of travel of the originating node or the rebroadcast node.

In this embodiment a node is selected as a relay node if the node is behind the traveling direction of the originating node or the rebroadcasting node (opposite of traveling direction). In another embodiment a relay node is selected if the node is ahead of the originating node or the rebroadcasting node. These embodiments take into consideration the relevance of the message and the direction of movement of the relay node. For example, if the message is a report of an accident, the message is more likely to be relevant to a node coming toward the accident behind the traveling direction of the node reporting the accident. For the nodes in lanes moving in the same direction as the originating node, the relay node in this example is chosen behind the traveling direction of the originating node such that the message reaches the nodes where the message is most relevant. For the nodes in lanes moving in the opposite direction as the originating node, the relay node in this example is chosen ahead of the traveling direction of the originating node such that the message can be rebroadcast to nodes in the other opposite lanes where the message is most relevant.

If directionality is used, the sender cannot be later picked as the relay node. A relay node is chosen based on the sender's traveling direction and packet reception direction to minimize average end-to-end delay. The initial sender, i.e., originating node, picks the relay node in the direction opposite or the same direction of travel. Subsequent rebroadcasting nodes pick the relay node in the direction opposite the direction from which the packet was received.

Figure 8:
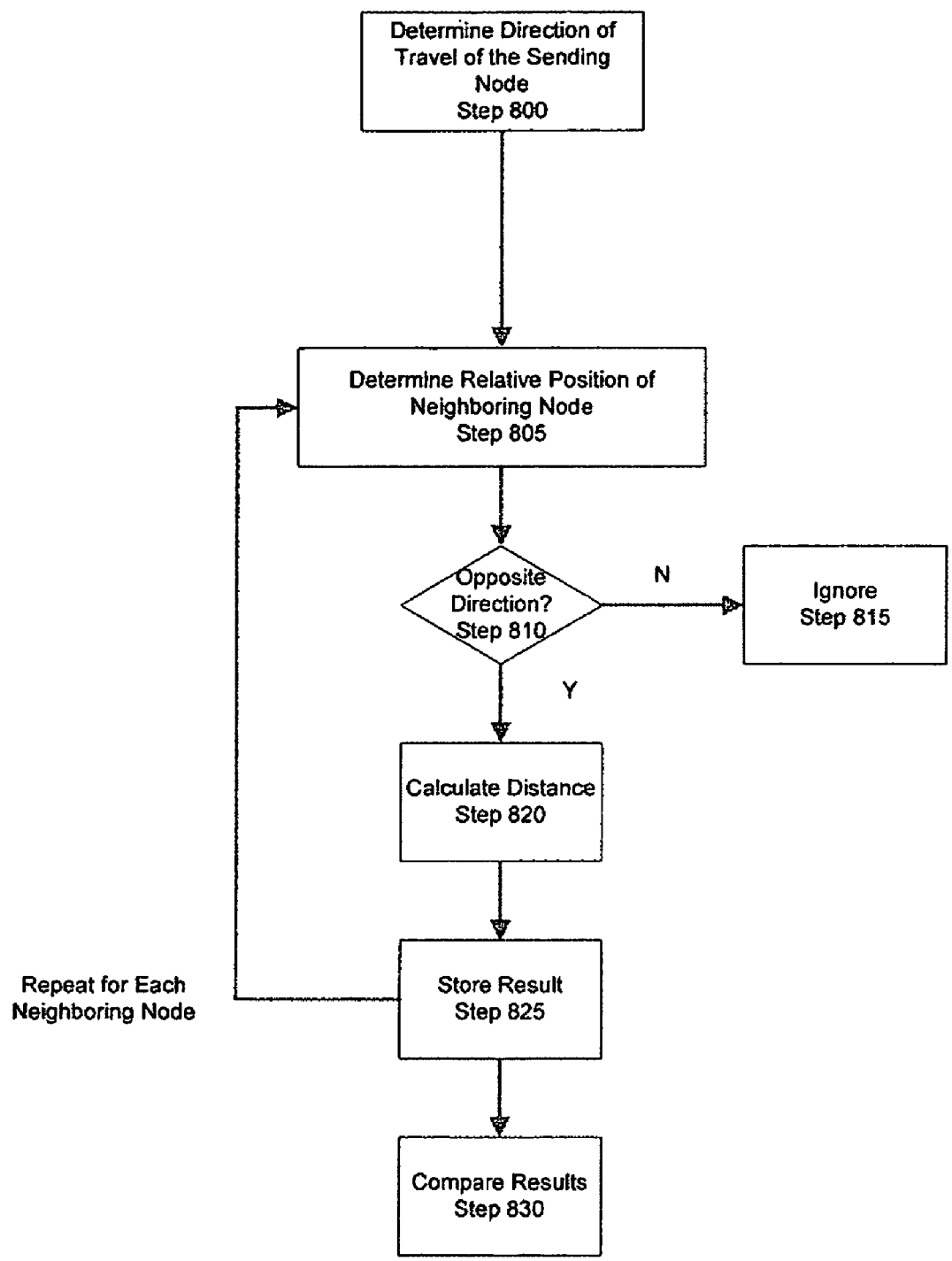
FIG. 8 illustrates a flow chart of a method of selecting an initial relay node according to an embodiment of the invention.

FIG. 8 illustrates a method for selecting an initial relay node according to this embodiment of the invention. At step 800, an originating node determines its direction of travel.

In one embodiment, this determination is based upon a current position and a previous position. In another embodiment, two consecutive positions are stored in the storage section 110. The originating node retrieves the position data from the storage section 110. The direction of travel of the originating node is found by computing an angle of travel using position information for two different time periods, e.g., $X1, Y1, Z1$ at time T1 and $X2, Y2, Z2$ at time T2 where $T2>T1$. The angle of travel, dir_angle, can be computed at the equator with the following formula:

If $(Y2-Y1)>0$ and $(Z2-Z1)\neq 0$, dir_angle=$a\tan((Y2-Y1)/(Z2-Z1))$.

If $(Y2-Y1)<0$ and $(Z2-Z1)\neq 0$, dir_angle=$a\tan((Y2-Y1)/(Z2-Z1))+\pi$.

If $(Y2-Y1)=0$, dir_angle=$\pi/2$ or $3\pi/2$ depending if $(Z2-Z1)>=0$ or not respectively.

If $(Z2-Z1)=0$, dir_angle=$0$ or $\pi$ depending if $(Y2-Y1)>=0$ or not respectively.

At step 805, the node determines a relative position of a neighboring node. In an embodiment, a new set of coordinates is computed by applying two sets of transformations. First, the position axis is set by placing at the center of the axis the originating node's current position. The new coordinates are:

$X'=X-X2;$ $Y'=Y-Y2;$ $Z'=Z-Z2.$ $(X, Y, Z)$ are the coordinates for the position of the neighboring node. $X', Y', Z'$ are the translated coordinates after centering. Second, the translated coordinates after centering are rotated to orient the axis with the speed direction of travel of the originating node. The new coordinates are:

$X''=X';$ $Y''=Y'\cos(\text{dir\_angle})+Z'\sin(\text{dir\_angle});$ $Z''=Z'\cos(\text{dir\_angle})-Y'\sin(\text{dir\_angle}).$ At step 810, the node determines if the neighboring node is in the opposite direction of travel. If $Y''<0$, the neighboring node is located behind (opposite) the traveling direction of the originating node. If the neighboring node is not located behind the direction of travel, the neighboring node is ignored, at step 815.

If at step 810, it is determined that the neighboring node is located behind the direction of travel of the originating node, the node calculates the distance from the node to the neighboring node, at step 820. The distance D is computed as:

$D=\mathrm{sqrt}((X'')^2+(Y'')^2+(Z'')^2)$. The distance is stored in the storage section 110, at step 825.

Steps 805-825 are repeated for each neighboring node. At step 830, the originating node compares the calculated distance for each node that had the distance calculated and determines the node that has the maximum distance from the originating node.

The originating node selects as the relay node the neighbor that is the furthest neighboring node to be determined to be located in the opposite direction of travel. In an embodiment, a rebroadcast node selects a successive relay node from all neighboring nodes that is the furthest node in the opposite direction from which the data packet arrived.

Figure 9:
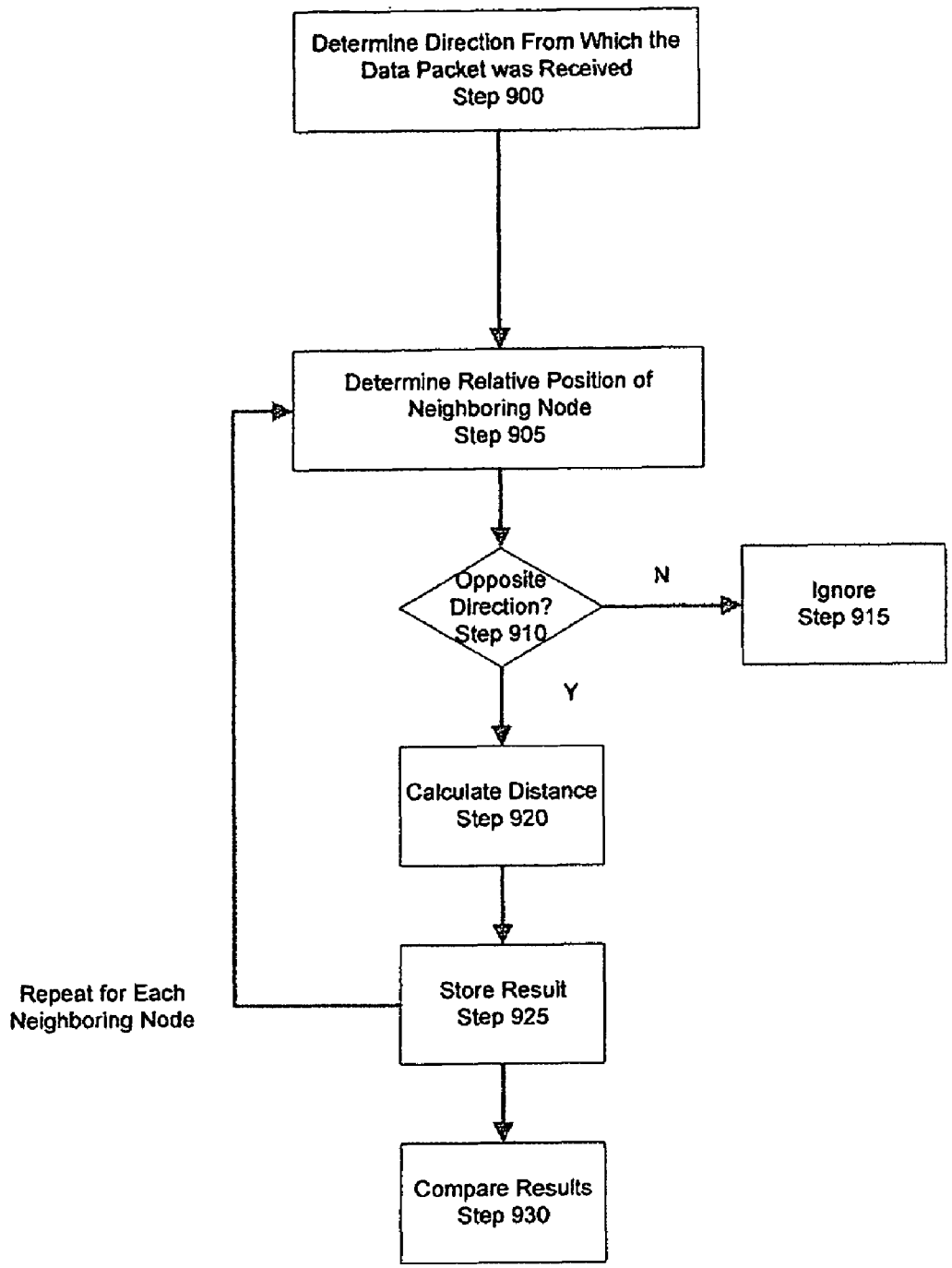
FIG. 9 illustrates a flow chart of a method of selecting a successive relay node according to an embodiment of the invention.

FIG. 9 illustrates the method of selecting successive relay nodes according to an embodiment of the invention. At step 900, the rebroadcasting node determines a direction from which a data packet originated, e.g., direction from source to rebroadcasting node. The direction of travel is found by computing an angle of travel between the sending node, e.g., originating node and the rebroadcasting node. The angle of travel, dir_angle, is computed at the equator using the following formula:

If $(MyZ-Zs)>0$ and $(MyY-Ys)\neq 0$, dir_angle=$a\tan((MyZ-Zs)/(MyY-Ys))$.

If $(MyZ-Zs)<0$ and $(MyY-Ys)\neq 0$, dir_angle=$a\tan((MyZ-Zs)/(MyY-Ys))+\pi$.

If $(MyY-Ys)=0$, dir_angle=$\pi/2$ or $3\pi/2$ if $(MyZ-Zs)>=0$ or not respectively.

If $(MyZ-Zs)=0$, dir_angle=$0$ or $\pi$ if $(MyY-Ys)>=0$ or not respectively.

Xs,Ys,Zs are the coordinates of the sending node and are determined based upon the position information included in the data packet. MyX,MyY,MyZ are the coordinates of the current location for the rebroadcasting node.

At step 905, the relative position of the neighboring node is determined, with respect to the rebroadcast node. A new set of coordinates is computed by applying two sets of transformations. First, the position axis is set by placing at the center of the axis the rebroadcasting node's current position. The new coordinates are:

$X'=X-myX$;

$Y'=Y-myY$;

$Z'=Z-myZ$;

where (X,Y,Z) are the coordinates of the neighboring node.

(X', Y', Z') are the translated coordinates after centering. Second, the translated coordinates after centering are rotated to orient the axis opposite the traveling direction of the received packet from the originating node or rebroadcasting node. The new coordinates are:

$X''=X'$;

$Y''=Y'\cos(\mathrm{dir\_angle})+Z'\sin(\mathrm{dir\_angle})$;

$Z''=Z'\cos(\mathrm{dir\_angle})-Y'\sin(\mathrm{dir\_angle})$.

At step 910, the node determines if the neighboring node is in the opposite direction from which the data packet was received, i.e., same direction of traffic. The purpose of the step is to determine if the neighboring node can help disseminate the data in the intended direction. If Y''>0, the neighboring node is located behind (opposite) the direction from which the data packet was received. If the neighboring node is not located in the opposite direction from which the data packet was received, the neighboring node is ignored, at step 915.

If at step 910, it is determined that the neighboring node is located in the opposite from which the data packet was received, the node will calculate the distance from the node to the neighboring node, at step 920. The distance D is computed as: $D=\mathrm{sqrt}((X'')^2+(Y'')^2+(Z'')^2)$. The distance is stored in the storage section 110, at step 925.

Steps 905-925 are repeated for each neighboring node. At step 930, the rebroadcasting node compares the distance of each node that is calculated and determines the node that is the maximum distance from the rebroadcasting node. The rebroadcasting node selects as the relay node the neighbor that is the furthest neighboring node to be determined to be located in the opposite direction from which the data packet was received.

Figure 10:
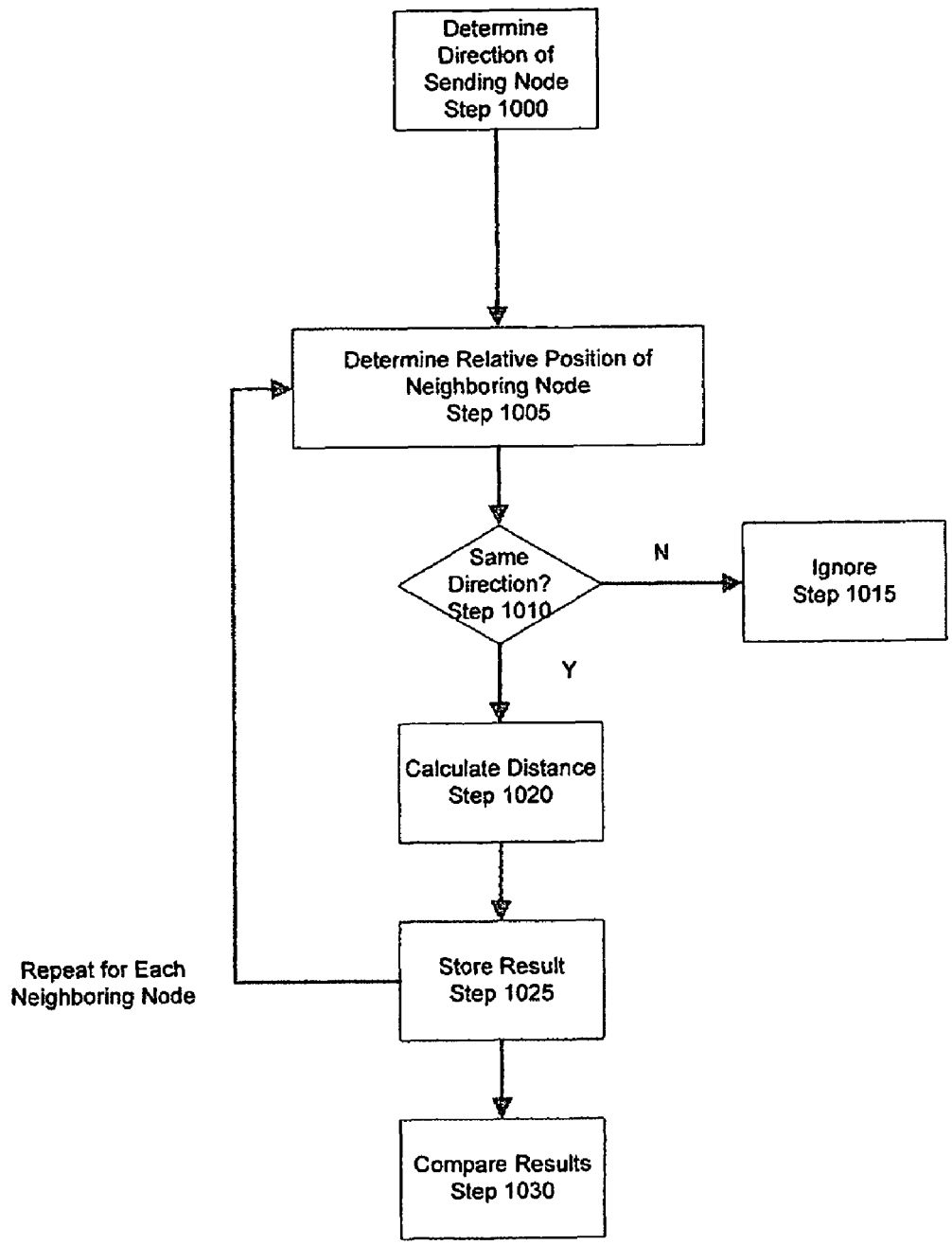
FIG. 10 illustrates a flow chart of a method of selecting an initial relay node according to another embodiment of the invention.

FIG. 10 illustrates another method for selecting the initial relay node. All of the steps illustrated in FIG. 10 are the same as those illustrated in FIG. 8 (steps 1000, 1005, 1015-1030) except that instead of determining if a neighboring node is located in the opposite direction of travel, the originating node determines if a neighboring node is located in the same direction of travel, at step 1010. If the neighboring node is not located in the same direction of travel (of the originating node), the neighboring node is ignored, at step 1015, and the distance is not calculated. If the neighboring node is located in the same direction of travel, the distance is calculated, at step 1020. In this embodiment, the neighboring node that is the furthest from the originating node that is also in the same direction of travel is selected as the initial relay node.

The rebroadcasting node, e.g., initial relay node, according to the method described in FIG. 9, selects all successive relay nodes.

In another embodiment, the originating node selects two initial relay nodes as opposed to one initial relay node. One of the two relay nodes is selected according to the method illustrated in FIG. 8 and the other is selected according to the method illustrated in FIG. 10. In other words, a first initial relay node is selected because it is the neighboring node that is the furthest from the originating node in the same direction of travel (of the originating node) and the second initial relay node is selected because it is the neighboring node that is the furthest from the originating node in the opposite direction of travel (of the originating node).

All successive relay nodes are selected by the rebroadcasting node, e.g., first or second relay node, according to the method described in FIG. 9. In this embodiment, the data packet transmitted from the originating node includes the message, the originating node's unique identifier, the originating node's position, the first relay node unique identifier, the distance from the originating node and the first relay node, the second relay node unique identifier, the distance from the originating node and the second relay node, and the time of broadcast.

The invention has been described herein with reference to a particular exemplary embodiment. Certain alterations and modifications may be apparent to those skilled in the art, without departing from the scope of the invention. The exemplary embodiments are meant to be illustrative, not limiting of the scope of the invention, which is defined by the appended claims.

What is claimed is:

1. A method for distributing a broadcast data packet to a plurality of moving nodes comprising the steps of:

receiving a broadcast data packet containing at least a message, a sender identifier, a location of a sender, an identifier for a relay node and distance from the sender and the relay node;

determining if a node receiving the broadcast data packet is the relay node; and distributing immediately the broadcast data packet to a plurality of moving nodes if the receiving node is the relay node, the broadcast data packet that is distributed includes an identifier for a successive relay node; wherein if the receiving node is determined not to be the relay node, the method further comprising:

waiting a period of time;

determining if a broadcast data packet is received from a different sender containing the same message, within the period of time; and distributing the broadcast data packet to a plurality of moving nodes if a broadcast data packet containing the same message is not received within the period of time, the broadcast data packet that is distributed includes an identifier for a successive relay node.

2. The method for distributing a broadcast data packet according to claim 1, further comprising the step of storing the message, the sender identifier, the location of the sender, and distance from the sender and the relay node.

3. The method for distributing a broadcast data packet according to claim 2, further comprising the steps of:

determining a location of the receiving node;

calculating a distance between the sending node and the receiving node based upon the location of the sender and the determined location of the receiving node;

retrieving the distance from the sender and the relay node; and calculating the period of time at least based on the calculated distance and the distance from the sender and the relay node.

4. The method for distributing a broadcast data packet according to claim 3, further comprising the step of setting a wait timer with the calculated period of time.

5. The method for distributing a broadcast data packet according to claim 3, wherein the period of time Wt=−(MaxWT/Range)*min{d,Range}+MaxWT, MaxWt is a default maximum wait time, range is the distance between the sending node and the relay node, and d is the calculated distance between the sending node and the receiving node.

6. The method for distributing a broadcast data packet according to claim 1, further comprising the step of:

selecting the relay node.

7. The method for distributing a broadcast data packet according to claim 6, wherein the step of selecting the relay node comprises the sub-steps of:

retrieving for each neighboring node, the neighboring node's identifier and position information;

calculating for each neighboring node, a distance from the sending node and the neighboring node; and determining one node from all neighboring nodes that is the furthest from the sending node;

wherein the neighboring node that is the furthest is selected as the relay node.

8. The method for distributing a broadcast data packet according to claim 1, further comprising the step of:

broadcasting periodically an information data packet, the information data packet contains at least the broadcasting node's identifier and its location.

9. The method for distributing a broadcast data packet according to claim 8, further comprising the steps of:

receiving from a plurality of neighboring nodes the periodic information data packet; and storing the node's identifier and location in a forwarding table, wherein the location of each neighboring node is stored for at least two consecutive periods.

10. The method for distributing a broadcast data packet according to claim 6, further comprising the steps of:

determining a direction of movement of the sender;

determining a location of the sender;

calculating, for each neighboring node, a distance from the sender;

determining, for each neighboring node, a relative location with respect to the direction of movement of the sender; and comparing, for each neighboring node, the determined direction of movement with the relative location, wherein a neighboring node that is the furthest node having a relative location in an opposite direction of movement of the sender is selected as the relay node.

11. The method for distributing a broadcast data packet according to claim 6, further comprising the steps of:

determining, periodically, a location of each node; and storing, the determined location of each node, wherein each node maintains its location in storage for at least two consecutive periods.

12. The method for distributing a broadcast data packet according to claim 11, wherein the direction of movement for each node is determined based upon a current location of a node and a location of the node from a previous period.

13. A method for distributing a broadcast data packet to a plurality of moving nodes comprising the steps of:

receiving a broadcast data packet containing at least a message, a sender identifier, a location of a sender, an identifier for a first and second relay node and distance from the sender and each of the first and second relay nodes;

determining if a node receiving the broadcast data packet is either the first or second relay node; and distributing immediately the broadcast data packet to a plurality of moving nodes if the receiving node is the first or second relay node, the broadcast data packet that is distributed includes an identifier for a successive relay node; wherein the receiving node is determined not to be the first or second relay node, the method further comprising:

waiting a set period of time;

determining if a broadcast data packet is received from a different sender containing a same message within the period of time; and distributing the broadcast data packet to a plurality of moving nodes if a broadcast data packet containing the same message is not received within the period of time, the broadcast data packet that is distributed includes an identifier for a successive relay node.

14. The method for distributing a broadcast data packet according to claim 13, further comprising the step of selecting the first and second relay nodes.

15. The method for distributing a broadcast data packet according to claim 14, wherein a neighboring node that is the furthest node having a relative location behind the direction of movement of the sender is selected as the first relay node.

16. The method for distributing a broadcast data packet according to claim 14, wherein a neighboring node that is the furthest node having a relative location ahead of the direction of movement of the sender is selected as the second relay node.

17. The method for distributing a broadcast data packet according to claim 13, wherein the forwarding steps include the sub-step of:
   selecting a successive relay node from the plurality of moving nodes.

18. The method for distributing a broadcast data packet according to claim 17, wherein the selecting of the successive relay node comprising the steps of:
   retrieving for each neighboring node of the relay node, the neighboring node's identifier and position information;
   calculating for each neighboring node of the relay node, a distance from the relay node and the neighboring node; and
   determining one node from all neighboring nodes that is the farthest from the relay node,
   wherein the neighboring node that is the furthest from the relay node is selected as the successive relay node.

19. The method for distributing a broadcast data packet according to claim 17, further comprising the steps of:
   determining a direction of movement of the data packet;
   determining a location of the relay node;
   calculating, for each neighboring node, a distance from the relay node;
   determining, for each neighboring node, a relative position of the neighboring node and the relay node; and
   comparing, for each neighboring node the determined direction of movement of the data packet with the relative position of the neighboring node,
   wherein a neighboring node that is the furthest node having a relative location in a direction opposite to the direction from which the data packet is received is selected as the successive relay node.

* * * * *